US006404304B1

(12) United States Patent
Kwon et al.

(10) Patent No.: US 6,404,304 B1
(45) Date of Patent: Jun. 11, 2002

(54) MICROWAVE TUNABLE FILTER USING MICROELECTROMECHANICAL (MEMS) SYSTEM

(75) Inventors: Young Woo Kwon; Yong Kweon Kim; Hong Teuk Kim; Jae Hyoung Park, all of Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/521,416

(22) Filed: Mar. 8, 2000

(30) Foreign Application Priority Data

Oct. 7, 1999 (KR) .......................................... 99/43243

(51) Int. Cl.7 .......................... H01P 1/203; H01P 1/10; H01G 7/00

(52) U.S. Cl. ........................ 333/202; 333/262; 361/277

(58) Field of Search ................................ 333/202, 246, 333/262; 361/277

(56) References Cited

U.S. PATENT DOCUMENTS

| | | | | | |
|---|---|---|---|---|---|
| 4,338,582 | A | * | 7/1982 | Presser | 333/175 |
| 5,644,349 | A | * | 7/1997 | Martin | 347/46 |
| 5,808,527 | A | * | 9/1998 | De Los Santos | 333/205 |
| 5,818,683 | A | * | 10/1998 | Fujii | 361/277 |
| 6,215,644 | B1 | * | 4/2001 | Dhuler | 361/280 |
| 6,218,911 | B1 | * | 4/2001 | Kong et al. | 333/101 |

FOREIGN PATENT DOCUMENTS

| | | | | |
|---|---|---|---|---|
| JP | 10-70040 | * | 3/1998 | H01G/5/16 |

* cited by examiner

*Primary Examiner*—Robert Pascal
*Assistant Examiner*—Dean Takaoka
(74) *Attorney, Agent, or Firm*—Fleshner & Kim, LLP

(57) ABSTRACT

A microwave tunable filter having some advantages as follows: a) the integration of MEMS tunable filter and MMIC; b) the very low signal transmission loss and low dispersion; and c) the drastic variation and linear characteristic of frequency by means of MEMS capacitor and an external control signal. The microwave tunable MEMS filter includes a plurality of unit resonant cells, each unit resonant cell being formed by various serial and parallel combination of an inductor, a capacitor, a transmission line, and a variable MEMS capacitor, whereby capacitance variation of the variable MEMS capacitor in the unit resonant cell converts a resonant frequency of the unit resonant cell to thereby convert a center frequency of the filter.

15 Claims, 6 Drawing Sheets

(a)

(b)

(c)

MICROWAVE TUNABLE FILTER USING MICROELECTROMECHANICAL (MEMS) SYSTEM

BACKGROUND OF THE INVENTION

1. Field of the Invention

The present invention relates to a microwave tunable filter, and more particularly, to a microwave tunable filter within a millimeter band using microelectromechanical systems (hereinafter, referred to as 'MEMS').

2. Discussion of Related Art

Referring to FIGS. 1 and 2, the construction and operation of conventional microwave tunable filters are firstly described.

FIG. 1 is an exemplary view illustrating the construction of the conventional microwave frequency multiplexing system using multiple channel filters and switches. As shown, filters 1 to 3 corresponding to the number of the multiple channels are connected in parallel to each other, and then only a desired channel signal is transmitted and processed by the operation of switches 4 and 5.

In this case, since the number of filters corresponds to the number of multiple channels, the size of the frequency multiplexing system should be bulk and accordingly the cost of production should be high. In addition, upon switching of the desired filter, the unnecessary power consumption caused due to each switch can not be avoided.

To solve this problem, there is provided another conventional microwave tunable filter using unit resonant cells, as shown in FIG. 2.

As shown, a single unit resonant cell 12 is comprised of an inductor 6, a capacitor 7, a transmission line 8 and a varactor 9.

The varactor 9, which is a kind of variable capacitance diodes, is used in a microwave circuit in such a manner that the capacitance of varactor 9 was changed by the application of a reverse voltage to a pn junction.

Under the above construction, the unit resonant cells 12 to 14 are connected by means of an appropriate coupling to embody the microwave tunable filter.

The transmission line 8 can be formed by a microstripline or a coplanar waveguide and so on.

The center frequencies of the unit resonant cells 12 to 14 are converted in accordance with the variation of the capacitance of each varactor 9 to 11 which is made by the application of the bias voltage from the outside.

If the capacitance of the each varactor 9 to 11 is varied, the center frequencies of the unit resonant cells 12 to 14 are converted, which results in the conversion of the center frequency of the microwave tunable filter.

Instead of using the varactors 9 to 11, transistors or yttrium iron garnets can be used and in this case, of course, the basic construction of the microwave tunable filter is the same as FIG. 2.

It should be, however, noted that the conventional microwave tunable filters as shown in FIGS. 1 and 2 have some problems to be solved as follows:

firstly, in case of using the varactor, since the varactor has a low Q value, the loss of filter is increased due to the low Q value of the varactor in high frequency region; and secondly, the operation of varactor consumes the DC power and thereby, a high-frequency characteristic is deteriorated by the thermal degradation.

SUMMARY OF THE INVENTION

Accordingly, the present invention is directed to a microwave tunable filter that substantially obviates one or more of the problems due to limitations and disadvantages of the related arts.

An object of the invention is to provide a microwave tunable filter which can have the following advantages: a) the integration of MEMS tunable filter and MMIC; b) the very low signal transmission loss and low dispersion; and c) the drastic variation and linear characteristic of frequency by means of MEMS capacitor and an external control signal.

According to an aspect of the present invention, there is provided a microwave tunable filter using MEMS capacitors comprising a plurality of unit resonant cells, each unit resonant cell being formed by various serial and parallel combination of an inductor, a capacitor, a transmission line, and a variable MEMS capacitor, whereby capacitance variation of the MEMS capacitor in each of the unit resonant cell converts a resonant frequency of each of the unit resonant cell to thereby convert a center frequency of the filter.

In the embodiment of the present invention, a bias voltage, which varies the capacitance of the variable MEMS capacitor, is applied between the variable capacitor and ground via a bias voltage source and a high frequency choke for blocking a high frequency signal.

According to another aspect of the present invention, a microwave tunable filter using an MEMS capacitors comprising: a plurality of unit resonant cells each having variable MEMS capacitors and coupled properly to the unit resonant cell adjacent thereto for obtaining a microwave band pass filter characteristic; and a microwave choke portion having both ends connected correspondingly with a bias voltage source and each of the unit resonant cells, for performing the appliance of a low frequency voltage between the variable MEMS capacitors of the unit resonant cell and ground and for blocking the application of a microwave signal inputted from an input terminal of the filter to the bias voltage source.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings.

DETAILED DESCRIPTION OF PREFERRED EMBODIMENT

Reference will now be made in detail to the preferred embodiments of the present invention, examples of which are illustrated in the accompanying drawings.

Figure 1:
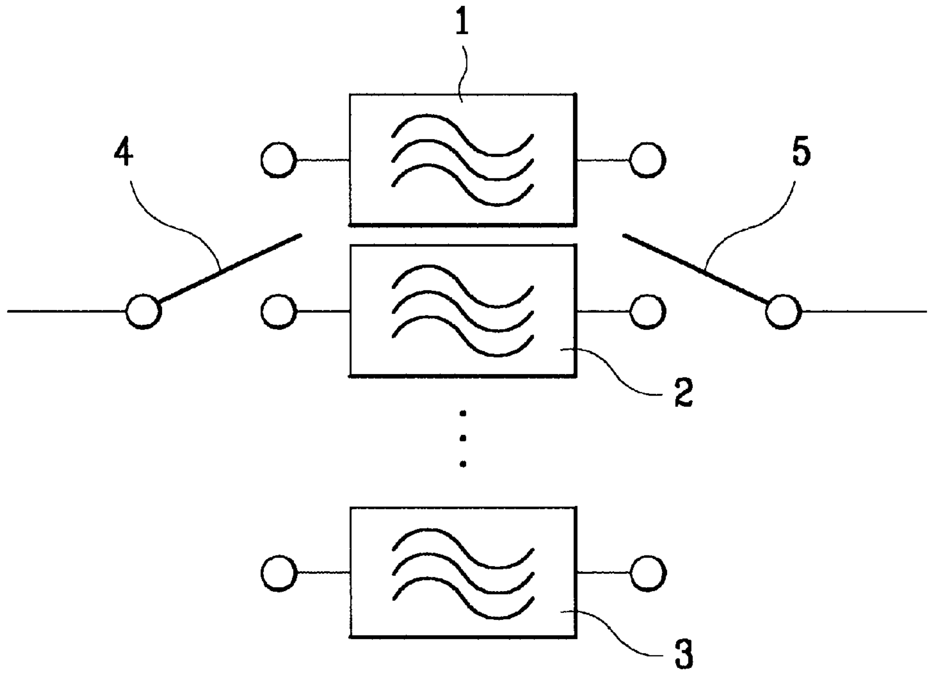
FIG. 1 Related Art
FIG. 1 is an exemplary view illustrating the construction of the conventional microwave frequency multiplexing system using multiple channel filters and switches.
Figure 2:
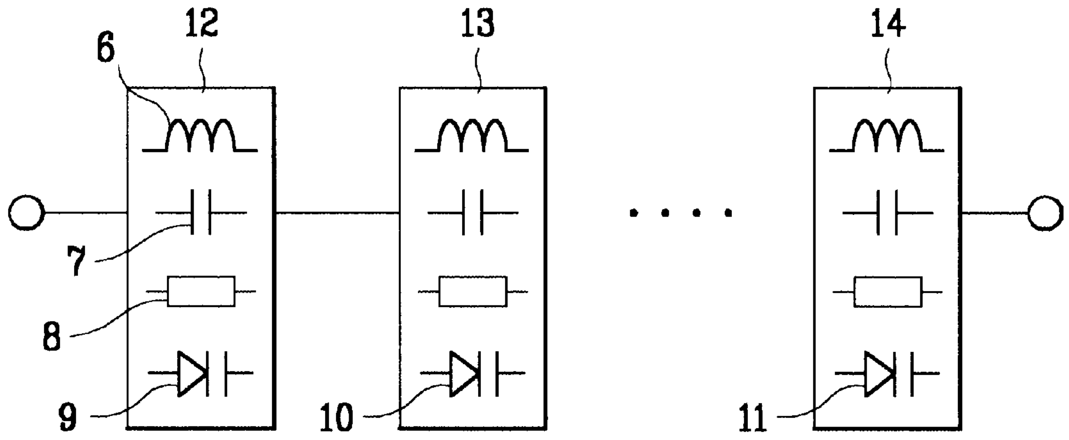
FIG. 2 Related Art
FIG. 2 is an exemplary view illustrating the construction of another conventional microwave tunable filter using unit resonant cells.
Figure 3:
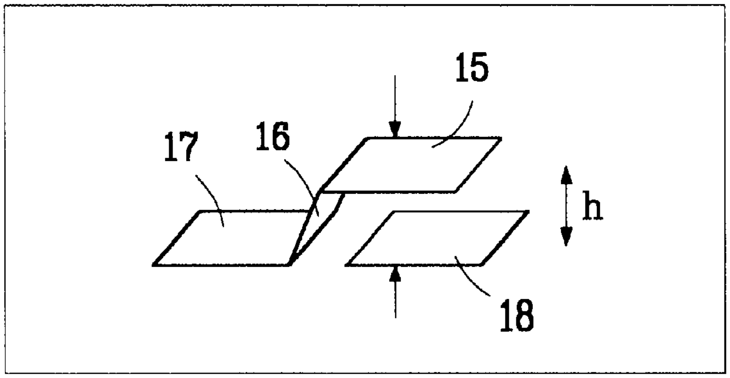
FIGS. 3A to 3C are exemplary views illustrating MEMS capacitors used as a variable capacitor according to the present invention.
FIG. 3D is an exemplary view illustrating the construction of a microwave tunable filter using the MEMS capacitors according to the present invention.
Figure 3:
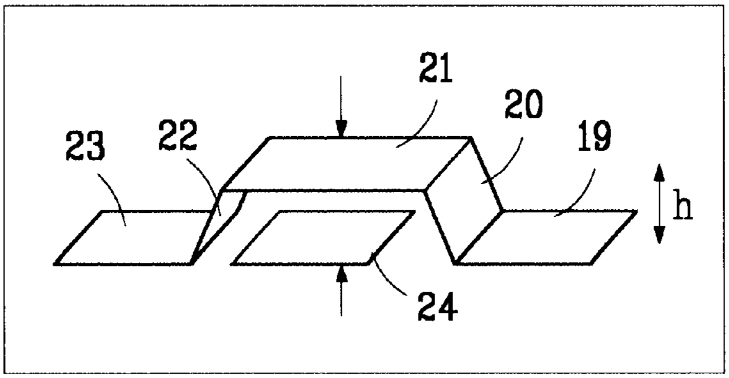
Figure 3:
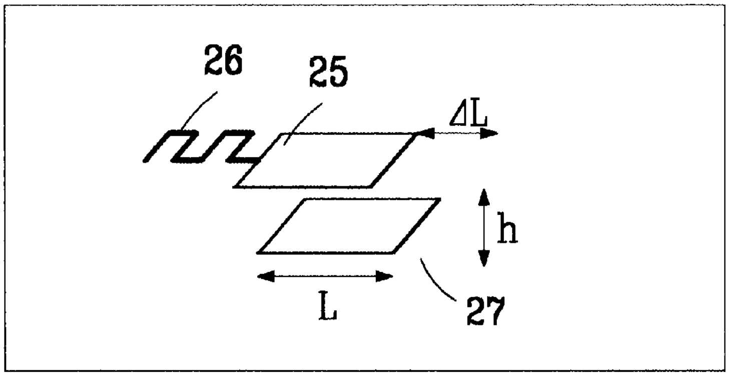
Figure 3:
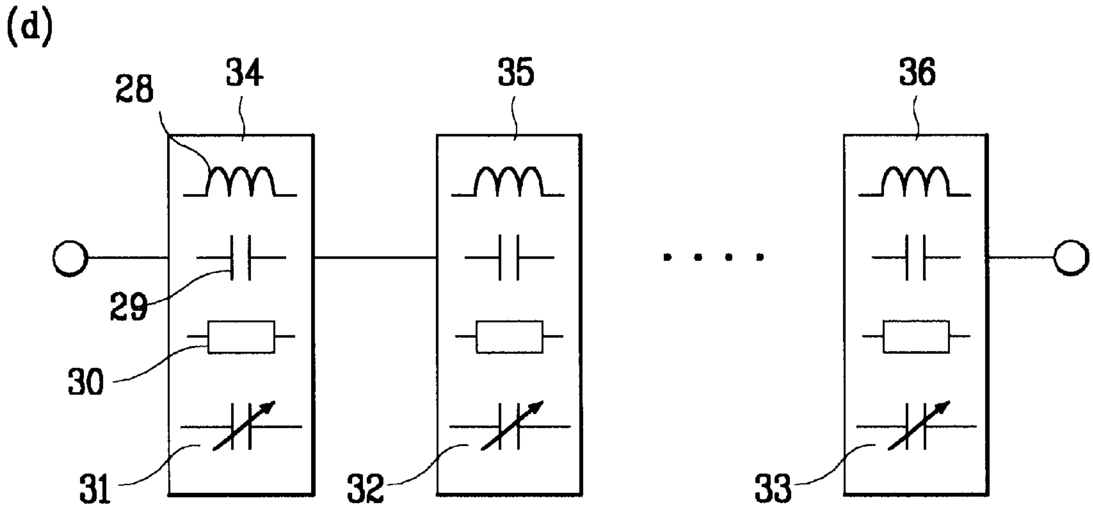

FIGS. 3A to 3C are exemplary views illustrating MEMS capacitors used as a variable capacitor according to the present invention.

Referring firstly to FIG. 3A, first and second metal plates 17 and 18 are attached on a substrate, and a third metal plate 15 is separated by an interval 'h' over one(for example, the second metal plate 18) of the first and second metal plates 17 and 18.

At this time, a fourth inclined metal plate 16 is formed to connect the side of the third metal plate 15 and the side of the first metal plate 17, for supporting the third metal plate 15.

Under the above construction, if a voltage from the outside is applied between the third and second metal plates 15 and 18, the interval 'h' existing therebetween is varied to thereby change the capacitance formed therebetween.

Referring to FIG. 3B, first and second inclined metal plates 20 and 22 are connected electrically to the both sides of a third metal plate 21, which is separated by a predetermined interval 'h' from a sixth metal plate 24 attached on the substrate, for supporting the third metal plate 21. In addition, the first and second inclined metal plates 20 and 22 are connected electrically to fourth and fifth metal plates 23 and 19.

Under the above construction, if a voltage from the outside is applied between the third and sixth metal plates 21 and 24, the interval 'h' existing therebetween is varied to thereby change the capacitance formed therebetween, in the same manner as FIG. 3A.

Referring finally to FIG. 3C, the MEMS capacitors used as the variable capacitor is comprised of a second metal plate 27 formed on the substrate, a first metal plate 25 being separated by a predetermined interval 'h' over the second metal plate 27 and moved left and right by the application of a voltage from the outside, and a semiconductor spring 26 connected to the side of the first metal plate 25, for supporting the first metal plate 25.

Under the above construction, the interval 'h' existing between the first and second metal plates 25 and 27 is not varied, unlike the embodiments of FIGS. 3A and 3B, and the area of the overlapped length ($L-\Delta L$) between the first and second metal plates 25 and 27 is varied to thereby change the capacitance formed therebetween.

The elastic coefficient of the semiconductor spring 26 is varied in accordance with the current applied thereto from the outside.

FIG. 3D is an exemplary view illustrating the construction of a microwave tunable filter using variable MEMS capacitors according to the present invention. As shown, the microwave tunable filter includes a plurality of unit resonant cells 34 to 36.

The first unit resonant cell 34 is formed by various serial and parallel combination of an inductor 28, a capacitor 29, a transmission line 30, and a variable MEMS capacitor 31, and the capacitance variation of the variable MEMS capacitor in the first unit resonant cell 34 converts a resonant frequency of the first unit resonant cell 34 to thereby convert a center frequency of the filter.

Under the above construction, the unit resonant cells 34 to 36 are connected by means of an appropriate coupling to embody the microwave tunable filter.

Of course, the second and third unit resonant cells 35 and 36 are constructed to have the similar components to those in the first unit resonant cells 34.

The transmission line 30 can be formed by a microstripline or a coplanar waveguide and so on.

At this time, the capacitance of the variable MEMS capacitors 31 to 33 in the first to third unit resonant cells 34 to 36 is varied in accordance with the bias voltage applied from the outside, as mentioned in FIGS. 3A to 3C, and thus the variation of capacitance thereof converts the resonant frequencies of the first to third unit resonant cells 34 to 36, thereby converting the center frequency of the filter.

The bias voltage is applied from the outside via a high frequency choke.

The high frequency choke is adapted to block a high frequency signal and to apply DC or a relative low frequency signal.

Figure 4A:
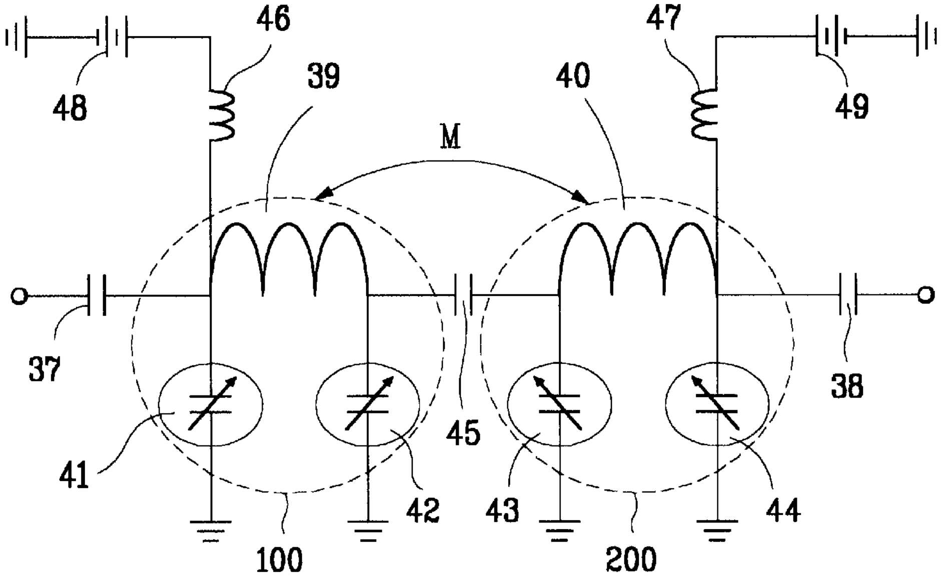
FIG. 4A is an exemplary view illustrating a lumped elements type of microwave tunable filter using the MEMS capacitors according to the present invention.
Figure 4B:
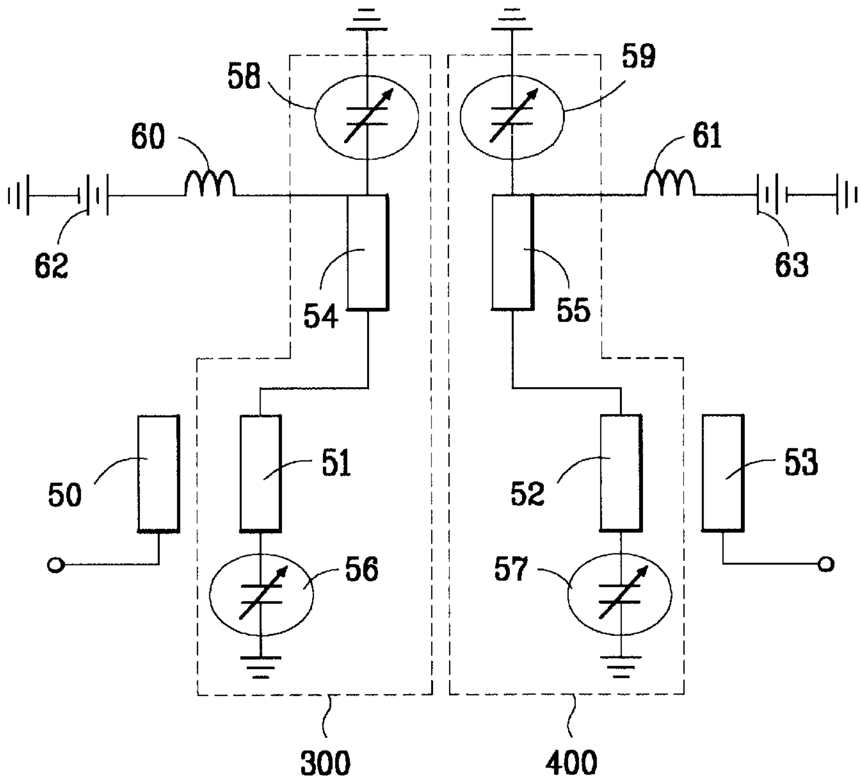
FIG. 4B is an exemplary view illustrating a resonators type of microwave tunable filter using the MEMS capacitors according to the present invention.

FIGS. 4A and 4B are exemplary views illustrating a band-pass filter with two poles which is constructed under the basic concept of the microwave tunable filter using the variable MEMS capacitor of FIG. 3D.

Referring to FIGS. 4A and 4B, the band-pass filter is comprised of bias voltage source portions 48, 49 and 62, 63 for applying a bias voltage to vary the capacitance, unit resonant cell portions 100, 200 and 300, 400 coupled properly between input and output load of the filter, for obtaining a microwave band-pass filter characteristic, and high frequency choke portions 46, 47 and 60, 61 having the both ends connected correspondingly to the bias voltage source portions 48, 49 and 62, 63 and the unit resonant cell portions 100, 200 and 300, 400, for blocking a high frequency signal.

The bias voltages from the voltage sources are transmitted to the variable mems capacitors 41 to 44 and 56 to 59.

The resonant cell portion 100 and 200, as shown in FIG. 4A, includes: inductors 39 and 40 connected to the high frequency choke portion 46 and 47; and the first and second variable MEMS capacitors 41, 42 and 43, 44 each formed between the both ends of each of the inductor 39 and 40 and ground.

On the other hand, the resonant cell portion 300 and 400, as shown in FIG. 4B, includes: second and fourth transmission lines 54 and 55 connected to the high frequency choke portion 60 and 61, for coupling with other resonant cells; first variable MEMS capacitors 58 and 59 formed between the one end of each of the second and fourth transmission lines 54 and 55 and the ground; first and third transmission lines 51 and 52 connected to the other end of each of the second and fourth transmission lines 54 and 55, for coupling with input and output load of the filter; and second variable MEMS capacitors 56 and 57 formed between the other end of each of the first and third transmission lines 51 and 52 and the ground.

The band-pass filter, as shown in FIG. 4A, is a two-pole lumped elements filter which includes: the first one-pole unit resonant cell 100 comprised of the variable MEMS capacitor 41, the inductor 39 and the variable MEMS capacitor 42;

and the second one-pole unit resonant cell 200 comprised of the variable MEMS capacitor 43, the inductor 40 and the variable MEMS capacitor 44.

The resonant frequency of each unit resonant cell 100 and 200 is determined upon the inductors 39 and 40 and the variable MEMS capacitors 41 to 44.

The first and second unit resonant cells 100 and 200 are coupled by means of a capacitor 45 and a mutual inductance 'M' therebetween. Coupling of the input and output load of the filter with the first and second resonant cells 100 and 200 are formed by means of capacitors 37 and 38, respectively.

At this time, the variable capacitors 41 to 44 having the semiconductor MEMS are embodied in the same construction as FIGS. 3A to 3C.

The bias voltage, which varies the capacitance of the variable mems capacitor, is applied, via the voltage source portion 48 and 49 and the high frequency choke portion 46 and 47 for blocking the high frequency signal, between each of the variable mems capacitors 41 to 44.

The band-pass filter, as shown in FIG. 4B, is at two-pole resonator filter which includes: the first one-pole unit resonant cell 300 comprised of the variable MEMS capacitor 56, the first transmission line 51, the second transmission line 54, and the variable MEMS capacitor 58; and the second one-pole unit resonant cell 400 comprised of the variable MEMS capacitor 57, the third transmission line 52, the fourth transmission line 55, and the variable MEMS capacitor 59.

Each of the first and second unit resonant cells 300 and 400 has the transmission line length corresponding to the half-wave length of the resonant frequency wavelength.

The unit resonant cells 300 and 400 are coupled by means of the second and fourth transmission lines 54 and 55. Coupling of the input and output load of the filter with the unit resonant cells 300 and 400 are formed by means of the first and fifth transmission lines 51 and 50, and the third and sixth transmission lines 52 and 53, respectively.

At this time, the variable MEMS capacitors 56 to 59 are embodied in the same construction as FIGS. 3A to 3C.

The bias voltage, which varies the capacitance of the variable MEMS capacitor, is applied, via the voltage source portion 62 and 63 and the high frequency choke portion 60 and 61 for blocking the high frequency current, between each of the variable MEMS capacitors 56 to 59 and the ground.

Figure 5A:
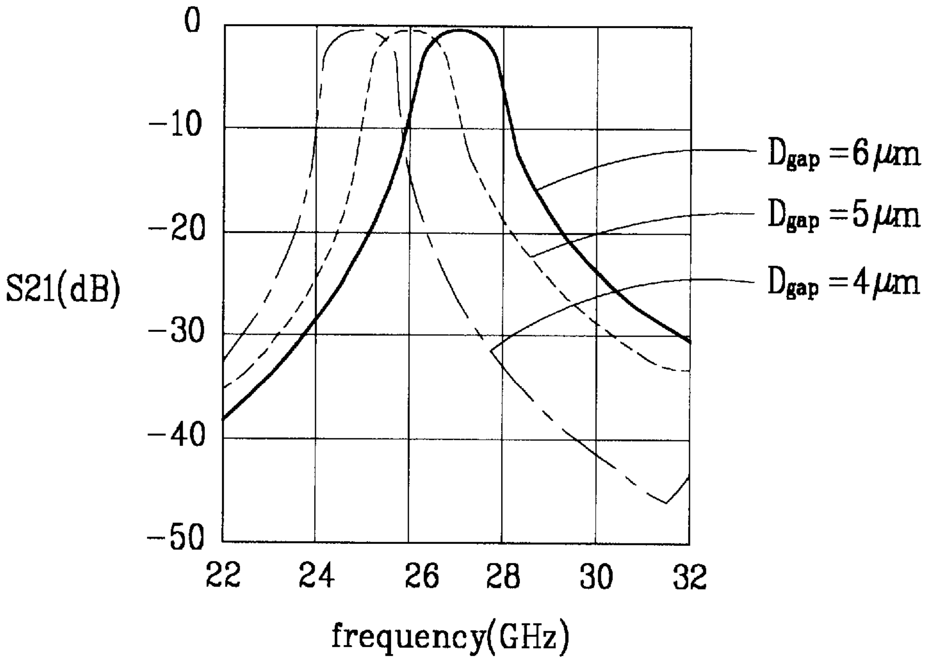
FIGS. 5A and 5B are graphs illustrating the simulation results of FIGS. 4A and 4B.
Figure 5B:
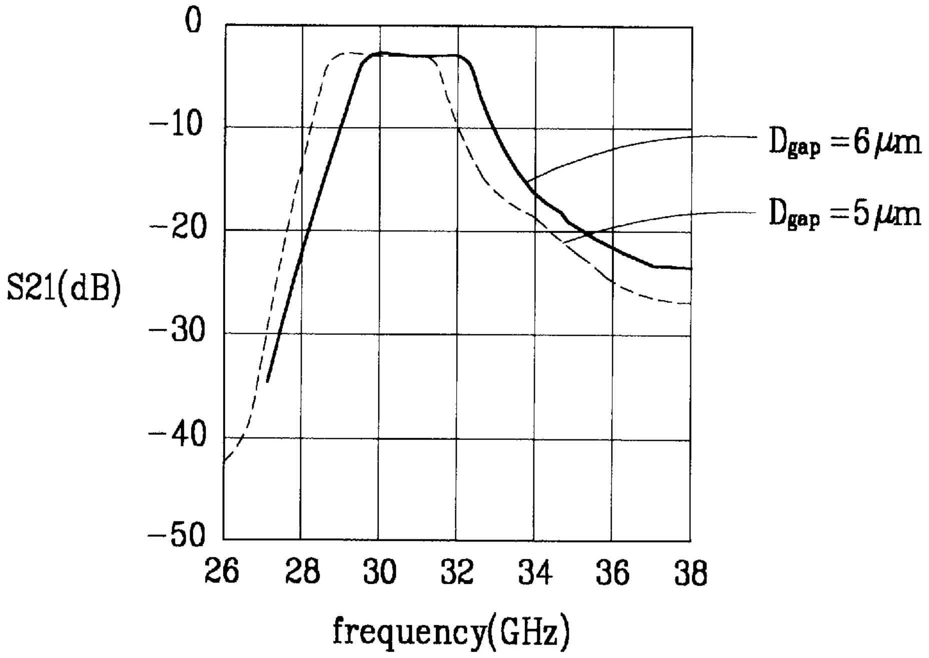

FIG. 5A is a graph illustrating the simulation results of FIG. 4A, and FIG. 5B is a graph illustrating the simulation results of FIG. 4B.

The symbol '$D_{gap}$' denoted in FIGS. 5A and 5B indicates the height ranged between the first metal plate 18 and the second lines 52 and 53, respectively.

At this time, the variable MEMS capacitors 56 to 59 are embodied in the same construction as FIGS. 3A to 3C.

The bias voltage, which varies the capacitance of the variable MEMS capacitor, is applied, via the voltage source portion 62 and 63 and the high frequency choke portion 60 and 61 for blocking the high frequency current, between each of the variable MEMS capacitors 56 to 59 and the ground.

FIG. 5A is a graph illustrating the simulation results of FIG. 4A, and FIG. 5B is a graph illustrating the simulation results of FIG. 4B.

The symbol '$D_{gap}$' denoted in FIGS. 5A and 5B indicates the height ranged between the first metal plate 18 and the second metal plate 15, as shown in FIG. 3A. The variation of the height '$D_{gap}$' renders the capacitance between the first and second metal plates 18 and 15 substantially varied, thereby changing the resonant frequencies of the unit resonant cells.

The variation of the capacitance of the variable MEMS capacitors of the unit resonant cells can adjust the center frequency of the filter.

Figure 6A:
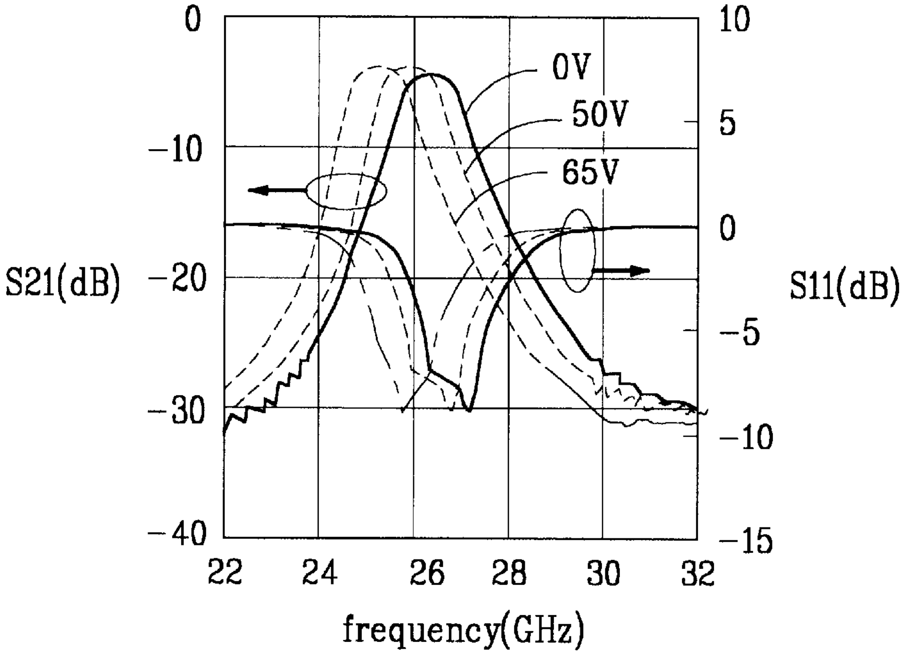
FIGS. 6A and 6B are graphs illustrating the really measured results of FIGS. 4A and 4B.
Figure 6B:
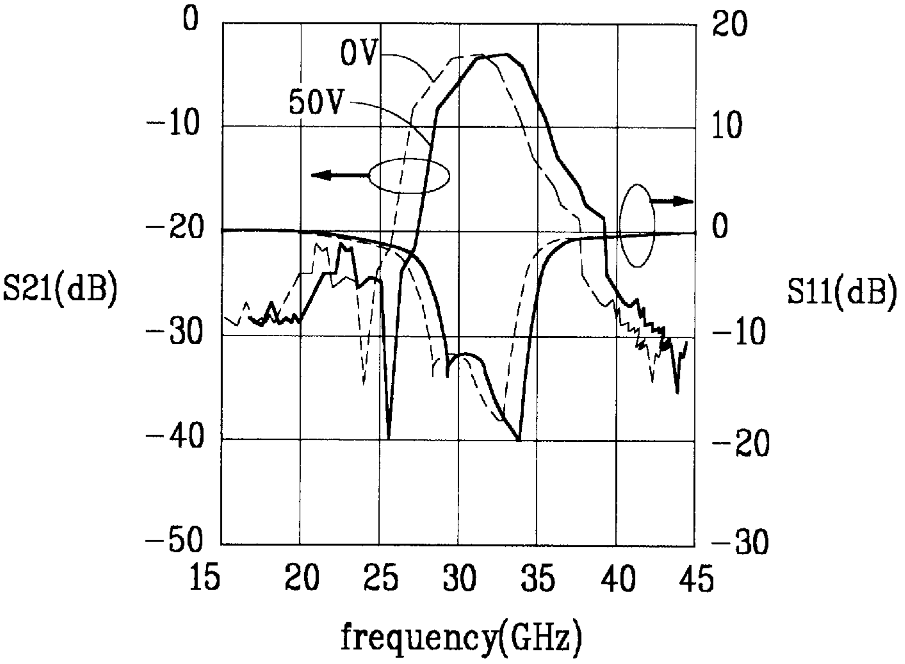

FIGS. 6A and 6B are graphs illustrating the really measured values of FIGS. 4A and 4B.

The reaction of filter is measured by using a network analyzer 'HP8510C'.

The calibration is executed in a short-open-load-through manner with 150 μm pitch Picoprobes and a calibration substrate made by GGB industries.

By using a DC probe, the DC bias voltage is applied between the cantilever beams as the variable MEMS capacitors movable upwardly and downwardly and a general GCPW top ground plate.

The center frequency of the two-pole lumped elements filter as shown in FIG. 6A is changed from 26.6 GHz without having any bias current to 25.5 GHz with the bias voltage of 65V (variation of 4.2%).

The center frequency of the two-pole resonators filter as shown in FIG. 6B is changed from 32 GHz without having any bias voltage to 31.2 GHz with the bias voltage of 50V (variation of 2.5%).

The pass band insertion loss is not varied within the variation range of the filter.

The minimum pass band insertion loss of 4.9 dB and 3.8 dB measured respectively in the lumped elements filter and the resonators filter is higher by 2 dB than the simulation results of FIGS. 5A and 5B.

The loss is generated due to the conduction loss at the metal through which the signal is passed, the dielectric loss on the substrate used and radiation loss. With the physical complement of the portion where the loss is generated, the amount of generation of loss can be reduced.

It can be appreciated that the maximum variation range (4.2%) measured in FIGS. 6A and 6B is lower than the variation range (6.4) of the simulation in FIGS. 5A and 5B.

This is because the partial refraction appears on the cantilever as the variable MEMS capacitor, upon application of power.

The lumped elements filter and the resonators filter each exhibit the variation range of 4.2% and 2.5% at the frequencies 26.6 GHz and 32 GHz.

In the case where the frequency variation is needed upon the circuit design error, process error, and degradation in a transmitting/receiving system, the application of the bias voltage applied from the outside renders the center frequency of the filter substantially varied, without any exchanging the filter. As a result, the frequency error of the transmitting/receiving system can be compensated for and the replacement of the plurality of frequency fixing filters is not needed, thereby reducing the maintenance cost of the product.

As discussed above, a microwave tunable filter using the variable MEMS capacitors according to the present invention can be utilized in microwave and mm-wave multiple band communication system within where the size of an element is tiny, and for high integrated transmission and reception in the low price.

It will be apparent to those skilled in the art that various modifications and variations can be made in a microwave tunable MEMS filter of the present invention without departing from the spirit or scope of the invention. Thus, it is intended that the present invention cover the modifications and variations of this invention provided they come within the scope of the appended claims and their equivalents.

What is claimed is:

1. A microwave tunable filter, comprising:

a plurality of unit resonant cells;

wherein each of said plurality of unit resonant cells comprises a combination of a variable MEMS capacitor and an inductor or a transmission line, wherein a capacitance of the variable MEMS capacitor determines a center frequency of the microwave tunable filter.

2. The filter as defined in claim 1, wherein each of said unit resonant cells comprises a serial or parallel combination of said variable MEMS capacitor and said inductor or said transmission line.

3. The filter as defined in claim 1, wherein said variable MEMS capacitor comprises:

a second conduction plate formed on a substrate;

a first conduction plate separated by a predetermined interval over said second conduction plate, said first conduction plate being movable left and right by the application of a voltage from the outside; and an elastic member electrically connected with one side of said first conduction plate, for supporting said first conduction plate.

4. The filter as defined in claim 1, wherein said variable MEMS capacitor comprises:

first and second conduction plates separated by a first predetermined interval from each other on a substrate;

a third conduction plate separated by a second predetermined interval over said second conduction plate, said third conduction plate being movable upwardly and downwardly by the application of a bias voltage from the outside; and a fourth conduction plate for electrically connecting the sides of said first and third conduction plates and for supporting said third conduction plate.

5. The filter as defined in claim 4, wherein said variable MEMS capacitor further comprises:

a fifth conduction plate on said substrate separated by the first predetermined interval from said second conduction plate; and a sixth conduction plate for electrically connecting said fifth and third conduction plates and for supporting said third conduction plate.

6. A microwave tunable filter, comprising:

a resonant cell portion including a plurality of unit resonant cells coupled to each other for passing a microwave band and having a plurality of variable MEMS capacitors;

a bias voltage source portion for applying a bias voltage on the one end of said unit resonant cells to thereby vary a capacitance of said variable MEMS capacitors; and a microwave choke portion having ends connected correspondingly with said bias voltage source portion and said unit resonant cell, for performing the appliance of a low frequency voltage between said variable MEMS capacitors of said unit resonant cell and ground and for blocking the application of a microwave signal inputted from an input terminal of said filter to said bias voltage source portion.

7. The filter as defined in claim 6, further comprising a plurality of capacitors each formed between said resonant cell portion and an input and output load of said filter.

8. The filter as defined in claim 7, wherein said resonant cell portion comprises said plurality of unit resonant cells, each of said unit resonant cells comprising:

an inductor connected to said high frequency choke portion; and first and second variable MEMS capacitors each formed between respective ends of said inductor and said ground.

9. The filter as defined in claim 6, further comprising a plurality of transmission lines formed between said resonant cell portion and an input and output load of said filter.

10. The filter as defined in claim 9, wherein said resonant cell portion comprises said plurality of unit resonant cells, each of said unit resonant cells comprising:

a first transmission line for coupling with a unit resonant cell adjacent thereto;

a first variable MEMS capacitor formed between one end of said first transmission line and ground;

a second transmission line, with one end connected to another end of said first transmission line, for coupling to the input and output load of said filter; and a second variable MEMS capacitor formed between another end of said second transmission line and ground.

11. A microwave tunable filter, comprising:

a first unit resonant cell including first and second variable MEMS capacitors with first ends connected to ground and second ends connected to a first inductor;

a second unit resonant cell including third and fourth variable MEMS capacitors with first ends are connected to ground and second ends connected to a second inductor;

first and second bias voltage source portions for applying a bias voltage on said first and second unit resonant cells to thereby vary the capacitance of said first to fourth variable MEMS capacitors; and first and second microwave choke portions with respective first ends connected to said first and second bias voltage source portions and respective second ends connected to said first and second unit resonant cells, for blocking the application of a microwave signal inputted from an input terminal of said filter to said first and second bias voltage source portions.

12. The filter as defined in claim 11, wherein said first and second inductors are each connected electrically between said first and second variable MEMS capacitors and between said third and fourth variable MEMS capacitors, respectively.

13. The filter as defined in claim 11, wherein the number of said unit resonant cells is not limited to only a two-pole filter, and is determined upon the demand of the filter, whereby said unit resonant cell achieves a microwave pass band filter characteristic by the coupling of the unit resonant cell adjacent thereto.

14. A microwave tunable filter, comprising:

a first unit resonant cell including first and second variable MEMS capacitors with first ends connected to ground and second ends are connected to first and second transmission lines;

a second unit resonant cell including third and fourth variable MEMS capacitors with first ends connected to ground and second ends connected to third and fourth transmission lines;

first and second bias voltage source portions for applying bias voltages on said first and second unit resonant cells, respectively, to thereby vary the capacitance of said first to fourth variable MEMS capacitors; and first and second microwave choke portions with respective first ends connected to said first and second bias voltage source portions and respective second ends connected to said first and second unit resonant cells for blocking the application of a microwave signal inputted from an input terminal of said filter to said first and second bias voltage source portions.

15. The filter as defined in claim 14, wherein said first and second transmission lines are connected in series between said first and second variable MEMS capacitors, and said third and fourth transmission lines are connected in series between said third and fourth variable MEMS capacitors.

* * * * *